Nov. 25, 1924.
C. W. RODGERS
1,516,688
FIREPLACE DAMPER
Filed June 2, 1924
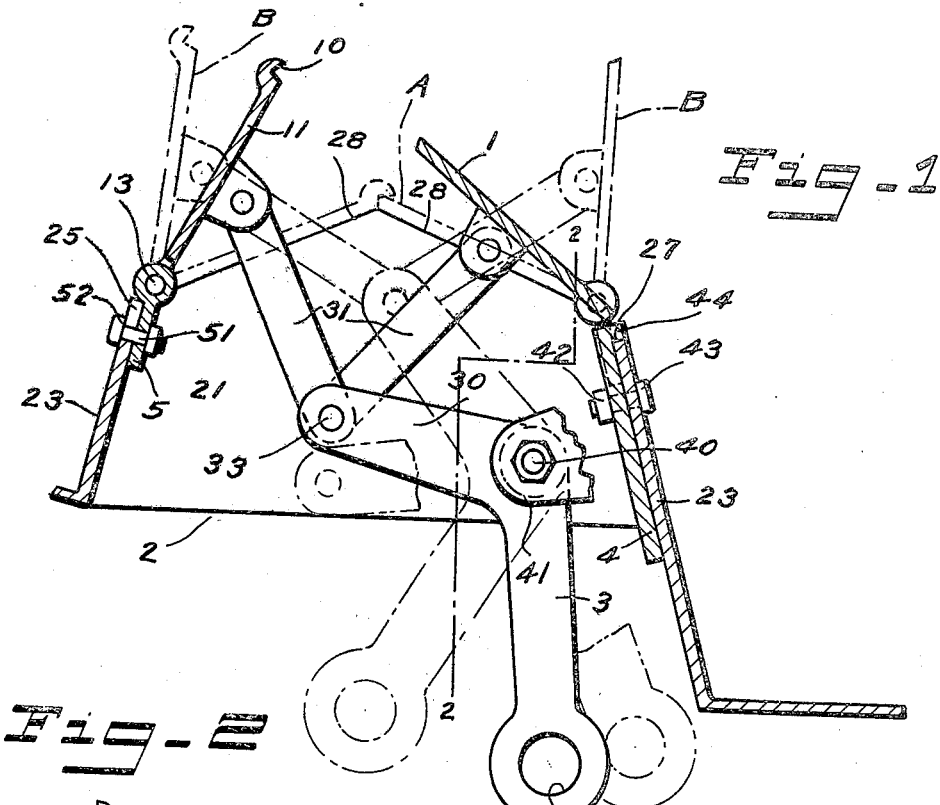
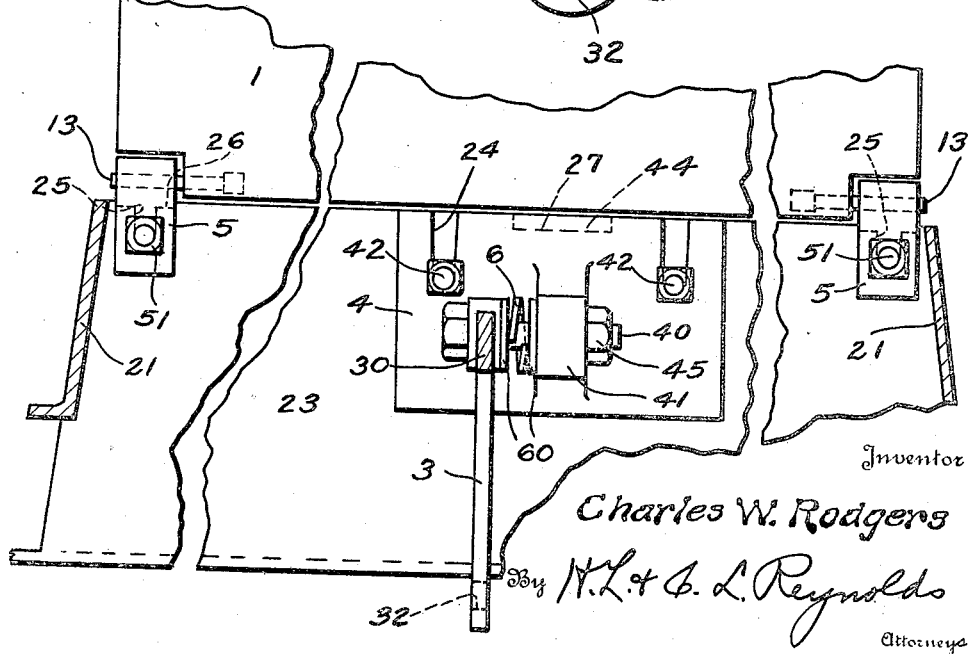
Inventor
Charles W. Rodgers
By H. L. & C. L. Reynolds
Attorneys Patented Nov. 25, 1924.

1,516,688

UNITED STATES PATENT OFFICE.

CHARLES W. RODGERS, OF SEATTLE, WASHINGTON.

FIREPLACE DAMPER.

Application filed June 2, 1924. Serial No. 717,274.

*To all whom it may concern:*

Be it known that I, CHARLES W. RODGERS, a citizen of the United States of America, and resident of the city of Seattle, in the county of King and State of Washington, have invented certain new and useful Improvements in Fireplace Dampers, of which the following is a specification.

My invention relates to dampers which are particularly intended to be employed in connection with open fireplaces. More especially it relates to dampers generally employing two complemental damper plates to close a throat opening and to the means for controlling the positions of the said damper plates, thereby to control the draft through the throat opening.

It is an object of my invention to provide such a damper which is convenient to control, and in which a pair of complemental damper plates are positively adjustable in position and capable of being retained in any adjusted position between full open and full closed positions.

It is a further object to provide such a damper in which the throat opening, when the damper is opened, is at all times unobstructed, to maintain a draft through the center of the throat opening rather than at one side.

A further object is the construction and arrangement of such a damper and its control means, whereby one of the complemental damper plates may be provided with a sealing bead, and whereby this damper plate may be lifted at the beginning of its opening movement more rapidly than the other damper plate, so that the second damper plate may easily clear this sealing bead in swinging over.

A further object is the construction of a damper employing a pivoted plate, whereby the pivot points for such plate, and preferably also for the control means therefor, may be formed separate from the damper and its frame, but so held in place when the damper is assembled that parts are properly and easily positioned and certainly held in place until it may be necessary or desirable to remove them.

Other objects, and particularly those relating to structural details, will be apparent from a study of the drawings accompanying this specification, wherein my invention is shown in a preferred embodiment, and of this specification and the claims terminating the same, wherein my invention is particularly pointed out.

Figure 1 is a transverse section through an embodiment of my invention, shown in place within a fireplace flue.

Figure 2 is a section on line 2—2 of Figure 1.

The draft is controlled by a pair of complemental damper plates 1 and 11, which are suitably journaled by their outer edges so that their swinging ends may approach towards or recede from each other. As a means for supporting these damper plates I may employ a frame or dome 2, which may be of any standard or usual construction, except as pointed out hereinafter. Such a dome is formed of side walls 23 and end walls 21 defining a throat opening 20 which is obstructed only as the damper plates 1 and 11 close it.

To control the damper I provide means which may be separable from beneath the lintel, such as the bell crank lever 3 pivoted at 40 adjacent the front wall 23 of the frame. This pivot, it will be noted, is well inward of the swinging edge of one of the damper plates, as 1. A horizontal arm 30 of the control lever, extends across the frame to a point beyond the swinging edge of the damper plate 1. At its outer end, as indicated at 33, a pair of thrust members such as the connecting links 31 are pivoted, these connecting the lever 3 each to its respective damper plate 1 and 11. In order to engage the control lever fore movement, its lower end may be provided with a hole 32 in which a poker is engageable.

It will be noted that with the damper plates closed the link 31 connected to the rear damper plate 11 lies substantially vertical. Inasmuch as the arm 30 lies substantially horizontal, the rear link 31 will lie approximately in a tangent to the arc of swing of the pivot pin 33. The forward link 31, however, lies along a cord of this arc of swing, inasmuch as it extends forward as well as upward from the pivot pin 33. The result is that the damper plate 11, upon first beginning the opening movement, will be given considerably more movement for a given movement of the pivot pin 33 than will the damper plate 1. This permits the employment of a sealing bead 10 at the swinging edge of the damper plate 11, which will overlie the swinging edge of the damper plate 1 and will securely seal the meeting edges of the two plates when the damper is closed, yet which will enable this sealing bead 10 to be swung rapidly out of the way to enable the damper plate 1 to clear it as it swings upward more slowly.

Toward the end of the opening movement, however, the forward link 31 will more nearly assume a tangent position with respect to the arc of swing of the pivot pin 33, while the rear link 31 will come more nearly into line with the arm 30 of the control lever. This will result in slowing down and practically stopping the swinging of the rear damper plate 11, but will move the forward damper plate 1 more rapidly. This arrangement consequently enables full opening of the damper and also enables a rather delicate adjustment of the amount of opening of the damper.

To enable the frame 2 to be readily cast and to enable the damper to be easily and quickly assembled, I have formed the damper plates 1 and 11 with pivot pins or trunnions 13 at their ends, these being formed integral with or being permanently secured to the outer or pivoted edges of the damper plates, and have provided separable pivot blocks 5 apertured to receive the pivot pins 13. These pivot blocks preferably are all made alike so that they may be interchangeable, and are each provided with a headed stud projecting therefrom and adapted to engage in a notch 25 in the side walls 23 of the frame. These studs, as shown herein, take the form of a bolt 51 with a nut 52 threaded thereon so that when the bolt has been received within the notch 25, the pivot block may be held somewhat more firmly in place by tightening up the nut 52.

The device may be made equally as well, however, by merely forming a stud with a head corresponding to the nut 52. Preferably the upper edge of the walls 23 is notched as indicated at 26 to receive the enlarged portion of the pivot block 5, thereby to definitely position the same in its proper place.

A like construction may be employed in connection with the pivot 40 of the control lever 3. A second pivot block 4, carrying the pivot lug 41, is provided with studs 42 in the form, preferably, of bolts, having secured upon them the nuts 43, although in this form as in the form of pivot block previously described, integral headed studs may be employed. These bolts 42 are engageable each in its respective notch 24 of the front wall 23. The pivot block 4 may be further and more accurately positioned by means of a positioning lug 44 seating in a notch 27 in the upper edge of the front wall 23.

It is desirable to provide means for holding the damper plates in any adjusted position, and for this purpose I have shown a frictional control means, which may be positioned at any convenient point in the operating connections between the lever 3 and the damper plates 1 and 11, but which, in the form shown in Figures 1 and 2, is positioned at the pivot 40 of the control lever. It may comprise simply a spring washer 6 interposed between the lever 3 and the pivot lug 41, flat washers 60 being employed at each side of the spring washer 6 to permit easy movement of the lever 3. By proper adjustment of the nut 45, threaded upon the pivot bolt 40, the tension on the spring washer 6 may be adjusted. The control lever 30 and its connections to the dome and to the damper plates may be positioned at any point in the length of the dome, but for convenience is placed centrally thereof, in my preferred form.

It will be noted that the two damper plates 1 and 11, when in closed position, rest upon the upper edges 28 of the end walls 21, and preferably these edges 28 are inclined upwardly from each side to form a ridge at the line of meeting of the damper plates 1 and 11. From this closed position, represented by the dash lines A in Figure 1, the damper plates are movable to a position where their swinging edges are widely separated, as indicated by the dot-and-dash lines B. At all times, however, the draft through the dome is always central and is thus kept away from the throat and the damper plate except for their inner or swinging edges.

What I claim as my invention is:

1. In a fire-place damper, in combination with a frame having a throat opening, a pair of complemental damper plates pivoted at opposite sides of the throat opening, means connecting said plates for simultaneous operation, and frictional means for retaining said plates in any adjusted position.

2. In a fire-place damper, in combination with a frame having a throat opening, a pair of complemental damper plates pivoted at opposite sides of the throat, a thrust bar connected to the under side of each plate and having their lower ends connected to each other, and means for controlling the position of the connected ends of said thrust bars to control thereby the separation of the swinging edges of the damper plates.

3. In a fire-place damper, in combination with a frame having a throat opening, a pair of complemental damper plates pivoted at opposite sides of the throat, a thrust bar connected to the under side of each plate and having their lower ends connected to each other, means for controlling the position of the connected ends of said thrust bars to control the separation of the swinging edges of the damper plates, and frictional means for maintaining said plates in any adjusted position.

4. In a fire-place damper, in combination with a frame having a throat opening, a pair of complemental damper plates pivoted at opposite sides of the throat, a thrust bar connected to the under side of each plate and having their lower ends connected to each other, and a bell-crank control lever pivoted in said frame forwardly of the lower ends of said thrust bars, one arm extending rearwardly and being connected to said thrust bars, the other arm extending downwardly beneath the lower edge of the frame.

5. In a fire-place damper, in combination with a frame having a throat opening, a pair of complemental damper plates pivoted at opposite sides of the throat, a thrust bar connected to the under side of each plate and having their lower ends connected to each other, a bell-crank control lever pivoted in said frame forwardly of the lower ends of said thrust bars, one arm extending rearwardly and being connected to said thrust bars, the other arm extending downwardly beneath the lower edge of the frame, and friction means associated with the pivot of said bell-crank lever for holding said damper plates in any adjusted position.

6. In a fire-place damper, in combination with a frame having a throat opening, a pair of complemental damper plates pivoted at opposite sides of the throat opening, said plates when closed having their swinging edges meeting and being inclined upwardly from their pivots, and being adapted to swing upward from such closed position, thrust members depending from each of said plates, and means therebelow connected to said thrust members for simultaneous actuation of said damper plates.

7. In a fireplace damper, in combination with a frame having end walls and side walls, the upper edges of the end walls being inclined upwardly from each side, a pair of complemental damper plates, one being pivoted at the upper edge of each side wall, and when closed having their swinging edges meeting and at their sides resting upon the inclined edges of the end walls, and means within said frame for swinging said damper plates upward from such closed position.

8. In a fireplace damper, a pair of complemental damper plates adapted to meet along their inner edges and pivoted at their outer edges to swing towards and from each other, means for simultaneously swinging said plates, said plates and the said actuating means being disposed and arranged to move one plate, upon starting to separate them, more rapidly than the other.

9. In a fireplace damper, a pair of complemental damper plates meeting along their inner edges and pivoted at their outer edges to swing towards and from each other, a sealing bead at the inner edge of one of said plates overlying the inner edge of the other plate when closed, means connecting said plates for simultaneous actuation, said plates and the said actuating means being disposed and arranged to move the plate having the sealing bead, upon starting to separate them, more rapidly than the other.

10. In a fireplace damper, a pair of complemental damper plates meeting along their inner edges when closed and pivoted at their outer edges to swing towards and from each other, a single means controlling the operation of both of said plates, and connecting means between each plate and said control means arranged to move one plate, upon starting to separate them, more rapidly than the other, and to move the second plate more rapidly than the first at the end of said separating movement.

11. In a fireplace damper, a pair of complemental damper plates meeting along their inner edges when closed and pivoted at their outer edges to swing towards and from each other, an operating lever pivoted beneath one plate and extending substantially horizontally to a point beneath the other plate, and links connecting the end of said lever with each plate, the link to the first plate, when the damper is closed, extending backward towards the pivot of the operating lever and upward, and the link to the second plate extending substantially vertically.

12. In a fireplace damper, a pair of complemental damper plates meeting along their inner edges when closed and pivoted at their outer edges to swing towards and from each other, an operating lever pivoted beneath one plate and extending laterally to a point beneath the other plate, and links connecting the end of said lever with each plate, the link to the first plate, when the damper is closed, extending within the arc of swing of the end of the lever, and the link to the second plate extending substantially at a tangent to the arc of swing of the lever.

13. In a fireplace damper, in combination with a frame having end and side walls defining a throat opening, a damper plate movable to vary the size of the throat opening, pivot pins projecting at opposite ends of said damper plate, pivot blocks adapted to receive said pivot pins, and means interengageable between the frame and said pivot blocks to support said blocks and to prevent disengagement therefrom of the pivot pins.

14. In a fireplace damper, in combination with a frame having end and side walls defining a throat opening, a damper plate movable to vary the size of the throat opening, pivot pins projecting at each end of the outer edge of said damper plate, and studded pivot blocks adapted to receive said pivot pins, the walls of the frame having